United States Patent
Khlat et al.

(10) Patent No.: US 8,275,330 B1
(45) Date of Patent: Sep. 25, 2012

(54) RADIO FREQUENCY TRANSMITTER ENERGY SHIFTING DURING RAMP-DOWN

(75) Inventors: Nadim Khlat, Cugnaux (FR); Alexander Wayne Hietala, Phoenix, AZ (US)

(73) Assignee: RF Micro Devices, Inc., Greensboro, NC (US)

( * ) Notice: Subject to any disclaimer, the term of this patent is extended or adjusted under 35 U.S.C. 154(b) by 176 days.

(21) Appl. No.: 12/895,255

(22) Filed: Sep. 30, 2010

Related U.S. Application Data (60) Provisional application No. 61/247,376, filed on Sep. 30, 2009.

(51) Int. Cl.
*H04B 1/04* (2006.01)
(52) U.S. Cl. ..................................... 455/127.1; 375/296
(58) Field of Classification Search ............. 455/91, 455/114.1, 114.2, 114.3, 115.1, 116, 118, 455/126, 127.1, 127.4, 127.5; 375/295, 296, 375/302
See application file for complete search history.

(56) References Cited

U.S. PATENT DOCUMENTS

| 2005/0135502 | A1* | 6/2005 | Zhang et al. | 375/297 |
| 2007/0142007 | A1* | 6/2007 | Yan | 455/127.1 |
| 2007/0223621 | A1* | 9/2007 | Ahmed | 375/296 |
| 2008/0225984 | A1* | 9/2008 | Ahmed et al. | 375/302 |

* cited by examiner

*Primary Examiner* — Thanh Le
(74) *Attorney, Agent, or Firm* — Withrow & Terranova, P.L.L.C.

(57) ABSTRACT

The present disclosure relates to IQ modulation circuitry that during a data burst mode, modulates an RF carrier signal to provide a modulated RF signal, which is used for transmission of a transmit slot. During the data burst mode, a maximum energy spectrum peak of the modulated RF signal is about coincident with an RF carrier frequency of the RF carrier signal to comply with communications protocols. Further, during an energy-shifted ramp-down mode, which is coincident with ramp-down of the modulated RF signal, the IQ modulation circuitry modulates the RF carrier signal to provide the modulated RF signal. During the energy-shifted ramp-down mode, the maximum energy spectrum peak of the modulated RF signal is shifted away from the RF carrier frequency of the RF carrier signal to mitigate the effects of preparing for receiving an RF receive signal.

23 Claims, 8 Drawing Sheets

RADIO FREQUENCY TRANSMITTER ENERGY SHIFTING DURING RAMP-DOWN

This application claims the benefit of provisional patent application Ser. No. 61/247,376, filed Sep. 30, 2009, the disclosure of which is hereby incorporated herein by reference in its entirety.

FIELD OF THE DISCLOSURE

Embodiments of the present disclosure relate to radio frequency (RF) transmitters and associated modulation circuitry, RF receivers, and RF frequency synthesizers, all of which may be used in RF communications systems.

BACKGROUND OF THE DISCLOSURE

Figures 1A, 1B:
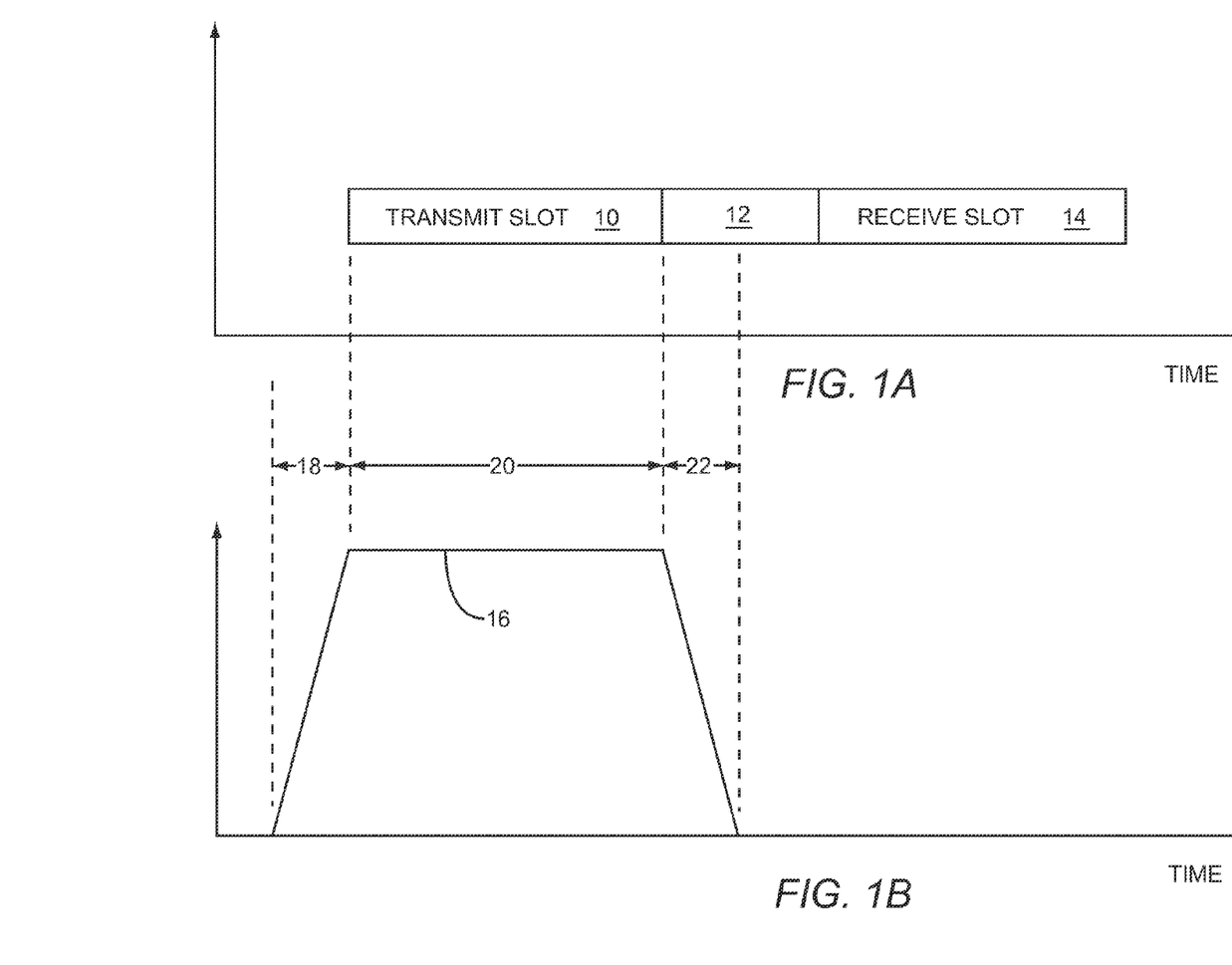
FIGS. 1A and 1B illustrate a transmission and reception scenario according to the prior art.

In time division duplex (TDD) RF communications systems, a communications terminal may transmit and receive using a common communications channel. Such transmissions and receptions are not simultaneous and may share a common RF carrier frequency. In some TDD protocols, a transmission may be shortly followed by a reception with a guard period between the transmission and the reception. However, with very short guard periods, the communications terminal may have difficulty transitioning between transmission and reception. FIGS. 1A and 1B illustrate a transmission and reception scenario in which the communications terminal sends a transmit slot 10, which is followed by a guard period 12, which is followed by a receive slot 14 that is received by the communications terminal according to the prior art. An average amplitude 16 of an RF transmit signal sent from the communications terminal has a ramp-up period 18, which is followed by a data burst period 20 that is concurrent with transmission of the transmit slot 10. The data burst period 20 is followed by a ramp-down period 22, which may consume a significant portion of the guard period 12. As such, the communications terminal continues to transmit until completion of the ramp-down period 22. As a result, since the remainder of the guard period 12 may be very short, the communications terminal may have difficulty in preparing to receive the receive slot 14.

In one example, if the communications terminal normally performs a direct current (DC) offset correction of its receiver when transitioning from transmit to receive, the remainder of the guard period 12 may be too short to perform the DC offset correction. Further, if the communications terminal performs the DC offset correction at the beginning of the guard period 12, transmission during the ramp-down period 22 may interfere with the DC offset correction. In another example, when tuning a receive frequency synthesizer in preparation to receive the receive slot 14, the transmission during the ramp-down period 22 may pull a frequency of the receive frequency synthesizer, such that the receiver is not ready to receive the receive slot 14 at the end of the guard period 12. Thus, there is a need to mitigate the effects of transmitting during the guard period 12 in preparation for receiving the receive slot 14.

SUMMARY OF THE EMBODIMENTS

The present disclosure relates to IQ modulation circuitry that during a data burst mode, modulates an RF carrier signal to provide a modulated RF signal, which is used for transmission of a transmit slot. During the data burst mode, a maximum energy spectrum peak of the modulated RF signal is about coincident with an RF carrier frequency of the RF carrier signal to comply with communications protocols. Further, during an energy-shifted ramp-down mode, which is coincident with ramp-down of the modulated RF signal, the IQ modulation circuitry modulates the RF carrier signal to provide the modulated RF signal. During the energy-shifted ramp-down mode, the maximum energy spectrum peak of the modulated RF signal is shifted away from the RF carrier frequency of the RF carrier signal to mitigate the effects of preparing for receiving an RF receive signal. In one embodiment of the IQ modulation circuitry, the maximum energy spectrum peak of the modulated RF signal is shifted away from the RF carrier frequency of the RF carrier signal to allow DC offset correction of RF down-conversion circuitry. In an alternate embodiment of the IQ modulation circuitry, the maximum energy spectrum peak of the modulated RF signal is shifted away from the RF carrier frequency of the RF carrier signal to compensate for pulling of a frequency synthesizer, which provides an RF local oscillator (LO) signal to the RF down-conversion circuitry.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION OF THE PREFERRED EMBODIMENTS

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to IQ modulation circuitry that during a data burst mode, modulates an RF carrier signal to provide a modulated RF signal, which is used for transmission of a transmit slot. During the data burst mode, a maximum energy spectrum peak of the modulated RF signal is about coincident with an RF carrier frequency of the RF carrier signal to comply with communications protocols. Further, during an energy-shifted ramp-down mode, which is coincident with ramp-down of the modulated RF signal, the IQ modulation circuitry modulates the RF carrier signal to provide the modulated RF signal. During the energy-shifted ramp-down mode, the maximum energy spectrum peak of the modulated RF signal is shifted away from the RF carrier frequency of the RF carrier signal to mitigate the effects of preparing for receiving an RF receive signal. In one embodiment of the IQ modulation circuitry, the maximum energy spectrum peak of the modulated RF signal is shifted away from the RF carrier frequency of the RF carrier signal to allow DC offset correction of RF down-conversion circuitry. In an alternate embodiment of the IQ modulation circuitry, the maximum energy spectrum peak of the modulated RF signal is shifted away from the RF carrier frequency of the RF carrier signal to compensate for pulling of a frequency synthesizer, which provides an RF local oscillator (LO) signal to the RF down-conversion circuitry.

Figure 2:
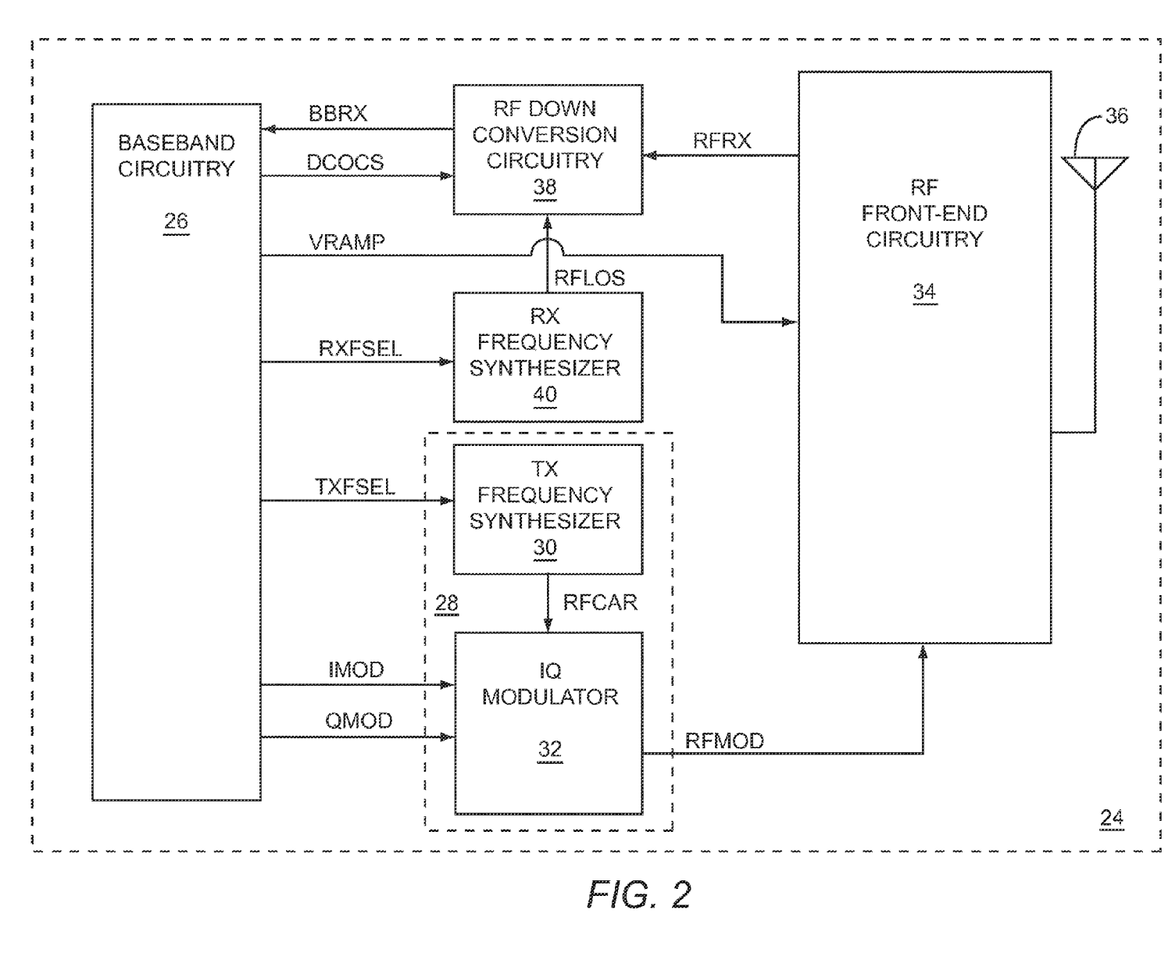
FIG. 2 shows RF circuitry according to one embodiment of the RF circuitry.

FIG. 2 shows RF circuitry 24 according to one embodiment of the RF circuitry 24. The RF circuitry 24 includes baseband circuitry 26, IQ modulation circuitry 28, which includes a transmit frequency synthesizer 30 and an IQ modulator 32, RF front-end circuitry 34, an antenna 36, RF down-conversion circuitry 38, and a receive frequency synthesizer 40. The RF front-end circuitry 34 is coupled to the antenna 36. The RF front-end circuitry 34 may provide an RF receive signal RFRX, which was received via the antenna 36, to the RF down-conversion circuitry 38. The RF down-conversion circuitry 38 may provide a baseband receive signal BBRX to the baseband circuitry 26 based on receiving and down-converting the RF receive signal RFRX. The baseband circuitry 26 may provide a transmit power ramp signal VRAMP to the RF front-end circuitry 34. The baseband circuitry 26 may provide a DC offset correction select signal DCOCS to the RF down-conversion circuitry 38 to control DC offset correction circuitry (not shown) in the RF down-conversion circuitry 38. The baseband circuitry 26 may provide a receive frequency select signal RXFSEL to the receive frequency synthesizer 40, which may provide an RF LO signal RFLOS to the RF down-conversion circuitry 38 for use in down-conversion of the RF receive signal RFRX. A frequency of the RF LO signal RFLOS may be selected by the receive frequency select signal RXFSEL. The baseband circuitry 26 may provide a transmit frequency select signal TXFSEL to the transmit frequency synthesizer 30, which may provide an RF carrier signal RFCAR to the IQ modulator 32. A frequency of the RF carrier signal RFCAR may be selected by the transmit frequency select signal TXFSEL. The baseband circuitry 26 may provide an in-phase modulation signal IMOD and a quadrature-phase modulation signal QMOD to the IQ modulator 32. The IQ modulator 32 may modulate the RF carrier signal RFCAR using the in-phase modulation signal IMOD and the quadrature-phase modulation signal QMOD to provide a modulated RF signal RFMOD to the RF front-end circuitry 34.

Figure 3:
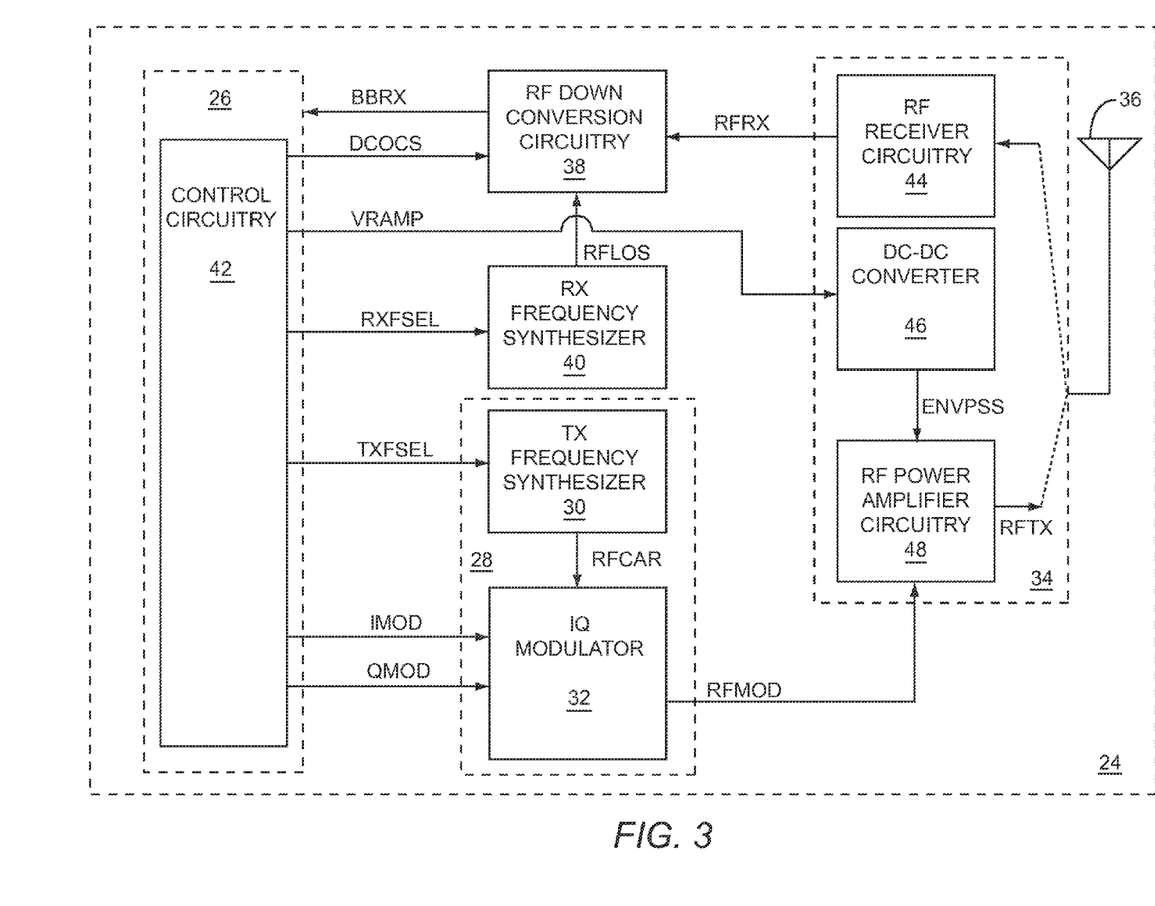
FIG. 3 shows details of baseband circuitry and RF front-end circuitry illustrated in FIG. 1 according to one embodiment of the baseband circuitry and the RF front-end circuitry.

FIG. 3 shows details of the baseband circuitry 26 and the RF front-end circuitry 34 illustrated in FIG. 1 according to one embodiment of the baseband circuitry 26 and the RF front-end circuitry 34. The baseband circuitry 26 includes control circuitry 42 and the RF front-end circuitry 34 includes RF receiver circuitry 44, a DC-DC converter 46, and RF power amplifier circuitry 48. The RF receiver circuitry 44 may receive and process RF signals from the antenna 36 to provide the RF receive signal RFRX to the RF down-conversion circuitry 38. The RF receiver circuitry 44 may filter, amplify, switch, or any combination thereof, the received RF signals from the antenna 36. The control circuitry 42 may provide the transmit power ramp signal VRAMP to the DC-DC converter 46. The control circuitry 42 may provide the receive frequency select signal RXFSEL, the transmit frequency select signal TXFSEL, the in-phase modulation signal IMOD, and the quadrature-phase modulation signal QMOD. The IQ modulator 32 provides the modulated RF signal RFMOD to the RF power amplifier circuitry 48.

In general, the control circuitry 42 selects a frequency of the RF carrier signal RFCAR via the transmit frequency select signal TXFSEL, the IQ modulator 32 modulates the RF carrier signal RFCAR to provide the modulated RF signal RFMOD to the RF power amplifier circuitry 48, which receives and amplifies the modulated RF signal RFMOD to provide an RF transmit signal RFTX to the antenna 36 for transmission. The DC-DC converter 46 provides an envelope power supply signal ENVPSS to the RF power amplifier circuitry 48 to provide power for amplification. The envelope power supply signal ENVPSS is based on the transmit power ramp signal VRAMP. In one mode of operation, the transmit power ramp signal VRAMP may track an amplitude ramp profile to cause the envelope power supply signal ENVPSS to track the amplitude ramp profile. The control circuitry 42 selects a frequency of the RF LO signal RFLOS via the receive frequency select signal RXFSEL, the RF down-conversion circuitry 38 receives and down-converts the RF receive signal RFRX using the RF LO signal RFLOS to provide the baseband receive signal BBRX to the baseband controller 26.

In one embodiment of the RF circuitry 24, the control circuitry 42 selects one of multiple operating modes. The multiple operating modes may include any or all of a ramp-up mode, a data burst mode, a standard ramp-down mode, an energy-shifted ramp-down mode, a receive preparation mode, and a receive mode. During the data burst mode, the RF circuitry 24 may transmit data via the RF transmit signal RFTX, the control circuitry 42 may select an RF carrier frequency of the RF carrier signal RFCAR via the transmit frequency select signal TXFSEL, and the IQ modulation circuitry 28 may modulate the RF carrier frequency of the RF carrier signal RFCAR to provide the modulated RF signal RFMOD, such that a maximum energy spectrum peak of the modulated RF signal RFMOD is about coincident with the RF carrier frequency. During the data burst mode, the IQ modulation circuitry 28 encodes the data to be transmitted by modulating the RF carrier signal RFCAR using the in-phase modulation signal IMOD and the quadrature-phase modulation signal QMOD to provide the modulated RF signal RFMOD.

During the energy-shifted ramp-down mode, which may immediately follow the data burst mode, the RF circuitry 24 has completed sending a transmit slot. However, the RF circuitry 24 continues to transmit via the RF transmit signal RFTX as an amplitude of the RF transmit signal RFTX ramps down. Further, during the energy-shifted ramp-down mode, the IQ modulation circuitry 28 modulates the RF carrier signal RFCAR to provide the modulated RF signal RFMOD, such that the maximum energy spectrum peak of the modulated RF signal RFMOD is shifted away from the RF carrier frequency.

In a first embodiment of the IQ modulation circuitry 28, during the energy-shifted ramp-down mode, the IQ modulation circuitry 28 modulates the RF carrier signal RFCAR to provide the modulated RF signal RFMOD, such that the maximum energy spectrum peak of the modulated RF signal RFMOD is shifted away from the RF carrier frequency by shifting the RF carrier frequency of the RF carrier signal RFCAR.

In a second embodiment of the IQ modulation circuitry 28, during the energy-shifted ramp-down mode, the IQ modulation circuitry 28 modulates the RF carrier signal RFCAR to provide the modulated RF signal RFMOD, such that the maximum energy spectrum peak of the modulated RF signal RFMOD is shifted away from the RF carrier frequency by amplitude modulating the RF carrier signal RFCAR.

In a third embodiment of the IQ modulation circuitry 28, during the energy-shifted ramp-down mode, the IQ modulation circuitry 28 modulates the RF carrier signal RFCAR to provide the modulated RF signal RFMOD, such that the maximum energy spectrum peak of the modulated RF signal RFMOD is shifted away from the RF carrier frequency by phase modulating the RF carrier signal RFCAR.

In a fourth embodiment of the IQ modulation circuitry 28, during the energy-shifted ramp-down mode, the IQ modulation circuitry 28 modulates the RF carrier signal RFCAR to provide the modulated RF signal RFMOD, such that the maximum energy spectrum peak of the modulated RF signal RFMOD is shifted away from the RF carrier frequency by amplitude modulating and phase modulating the RF carrier signal RFCAR.

In a fifth embodiment of the IQ modulation circuitry 28, during the energy-shifted ramp-down mode, the IQ modulation circuitry 28 modulates the RF carrier signal RFCAR to provide the modulated RF signal RFMOD, such that the maximum energy spectrum peak of the modulated RF signal RFMOD is shifted away from the RF carrier frequency by sending a string of data via the modulated RF signal RFMOD using the in-phase modulation signal IMOD and the quadrature-phase modulation signal QMOD.

In a sixth embodiment of the IQ modulation circuitry 28, during the energy-shifted ramp-down mode, the IQ modulation circuitry 28 modulates the RF carrier signal RFCAR to provide the modulated RF signal RFMOD, such that the maximum energy spectrum peak of the modulated RF signal RFMOD is shifted away from the RF carrier frequency by sending a string of data via the modulated RF signal RFMOD using the in-phase modulation signal IMOD and the quadrature-phase modulation signal QMOD, such that the string of data includes alternating ones and zeros.

In one embodiment of the control circuitry 42, the control circuitry 42 selects the ramp-up mode immediately followed by the data burst mode, which is immediately followed by the standard ramp-down mode.

In an alternate embodiment of the control circuitry 42, the control circuitry 42 selects the data burst mode, which is immediately followed by the energy-shifted ramp-down mode, which is immediately followed by the receive preparation mode, which is immediately followed by the receive mode.

In one embodiment of the RF power amplifier circuitry 48, during the data burst mode and during the energy-shifted ramp-down mode, the RF power amplifier circuitry 48 receives and amplifies the modulated RF signal RFMOD to provide the RF transmit signal RFTX. In one embodiment of the RF down-conversion circuitry 38, during the receive mode, the RF down-conversion circuitry 38 receives and down-converts the RF receive signal RFRX to provide the baseband receive signal BBRX. A carrier frequency of the RF transmit signal RFTX may be about equal to a carrier frequency of the RF receive signal RFRX. The RF transmit signal RFTX and the RF receive signal RFRX may be time division duplexing (TDD) signals. The RF transmit signal RFTX and the RF receive signal RFRX may be long term evolution (LTE) signals. The RF transmit signal RFTX and the RF receive signal RFRX may be time division synchronous code division multiple access (TD-SCDMA) signals.

In one embodiment of the receive frequency synthesizer 40, during the energy-shifted ramp-down mode, the receive frequency synthesizer 40 provides the RF LO signal RFLOS to the RF down-conversion circuitry 38, such that a frequency of the RF LO signal RFLOS corresponds to a desired receive frequency of the RF receive signal RFRX, and during the receive mode, the receive frequency synthesizer 40 provides the RF LO signal RFLOS to the RF down-conversion circuitry 38 for down-conversion of the RF receive signal RFRX, such that the frequency of the RF LO signal RFLOS corresponds to the desired receive frequency of the RF receive signal RFRX.

In one embodiment of the transmit frequency synthesizer 30, during the data burst mode, the transmit frequency synthesizer 30 provides the RF carrier signal RFCAR to the IQ modulator 32 to create the modulated RF signal RFMOD, and during the energy-shifted ramp-down mode, the transmit frequency synthesizer 30 provides the RF carrier signal RFCAR to the IQ modulator 32 to create the modulated RF signal RFMOD and the IQ modulator 32 adjusts the frequency of the RF LO signal RFLOS to correspond to the desired receive frequency of the RF receive signal RFRX by modulating the RF carrier signal RFCAR to compensate for pulling of the receive frequency synthesizer 40, such that the maximum energy spectrum peak of the modulated RF signal RFMOD is shifted away from the RF carrier frequency.

Figure 4:
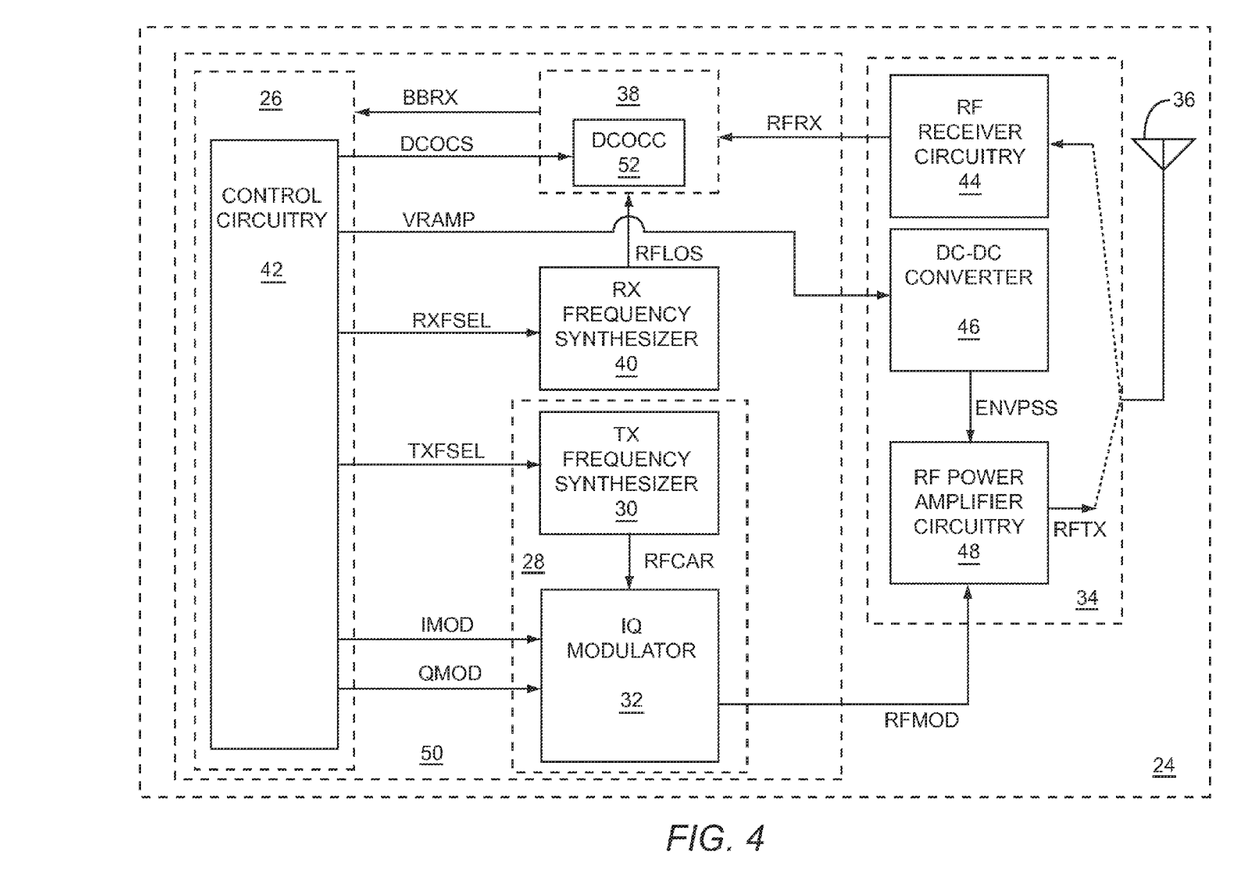
FIG. 4 shows the RF circuitry according to an alternate embodiment of the RF circuitry.

FIG. 4 shows the RF circuitry 24 according to an alternate embodiment of the RF circuitry 24. The RF circuitry 24 shown in FIG. 4 is similar to the RF circuitry 24 illustrated in FIG. 3, except in the RF circuitry 24 illustrated in FIG. 4, the RF circuitry 24 includes a transceiver integrated circuit (IC) 50, which includes the baseband circuitry 26, the IQ modulation circuitry 28, the RF down-conversion circuitry 38, and the receive frequency synthesizer 40. In the embodiment shown, the transceiver IC 50 receives the RF receive signal RFRX and provides the modulated RF signal RFMOD. In another embodiment (not shown) of the RF circuitry 24, the RF circuitry 24 excludes the RF front-end circuitry 34. Further, in the embodiment of the RF circuitry 24 shown in FIG. 4, the RF down-conversion circuitry 38 includes DC offset correction circuitry 52, which receives the DC offset correction select signal DCOCS. In one embodiment of the DC offset correction circuitry 52, during the energy-shifted ramp-down mode and the receive preparation mode, the DC offset correction circuitry 52 measures a DC offset of the RF down-conversion circuitry 38 to obtain a measured DC offset, and during the receive mode, the DC offset correction circuitry 52 applies a DC offset correction to the RF down-conversion circuitry 38 based on the measured DC offset. A bandwidth of the DC offset correction circuitry 52 during the receive preparation mode may be wider than the bandwidth of the DC offset correction circuitry 52 during the energy-shifted ramp-down mode.

Figure 5:
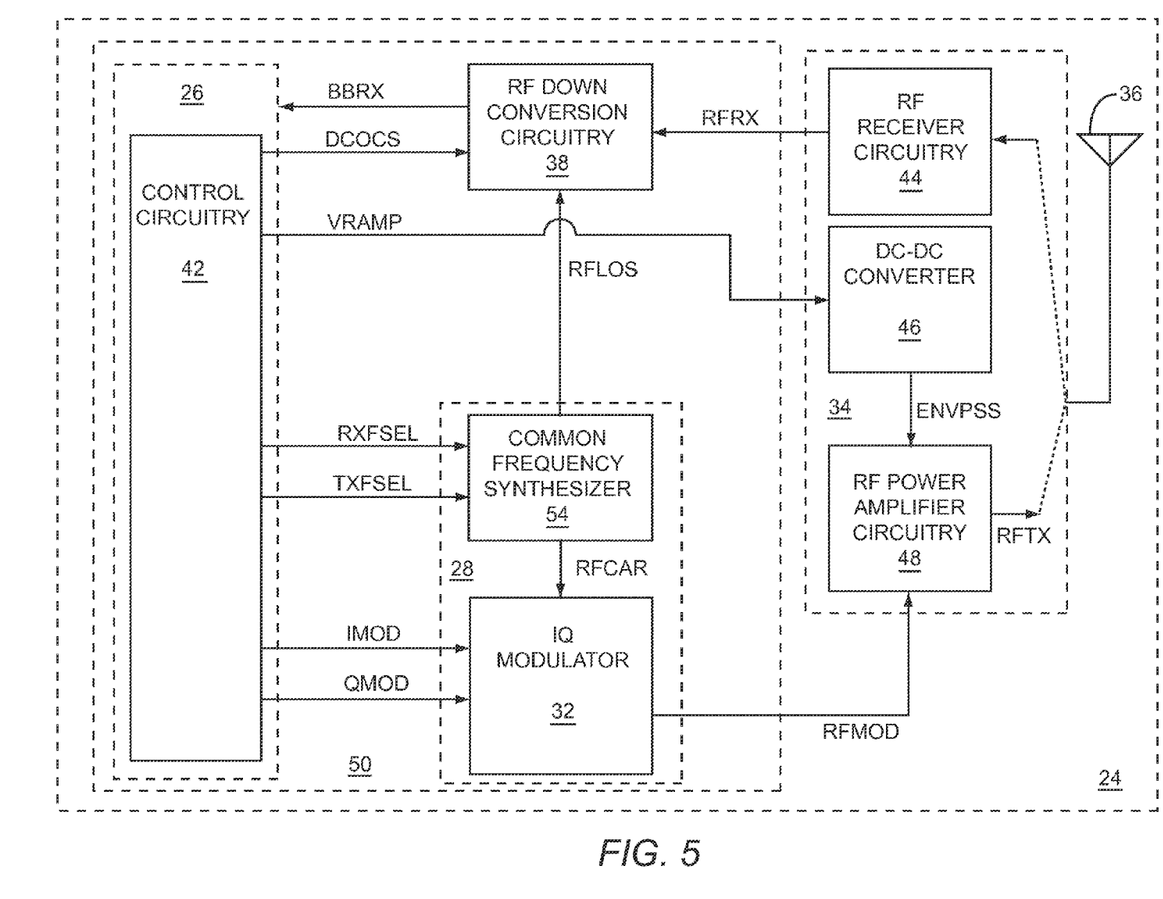
FIG. 5 shows the RF circuitry according to an additional embodiment of the RF circuitry.

FIG. 5 shows the RF circuitry 24 according to an additional embodiment of the RF circuitry 24. The RF circuitry 24 illustrated in FIG. 5 is similar to the RF circuitry 24 illustrated in FIG. 4, except in the RF circuitry 24 illustrated in FIG. 5, the transmit frequency synthesizer 30 and the receive frequency synthesizer 40 are both replaced with a common frequency synthesizer 54. The common frequency synthesizer 54 receives the transmit frequency select signal TXF- SEL and the receive frequency select signal RXFSEL, and provides the RF carrier signal RFCAR and the RF LO signal RFLOS based on the transmit frequency select signal TXFSEL and the receive frequency select signal RXFSEL, respectively.

In one embodiment of the common frequency synthesizer 54, during the data burst mode, the common frequency synthesizer 54 provides the RF carrier signal RFCAR to the IQ modulator 32 to create the modulated RF signal RFMOD. During the energy-shifted ramp-down mode, the common frequency synthesizer 54 provides the RF LO signal RFLOS to the RF down-conversion circuitry 38, such that a frequency of the RF LO signal RFLOS corresponds to a desired receive frequency of the RF receive signal RFRX, and the common frequency synthesizer 54 provides the RF carrier signal RFCAR to the IQ modulator 32 to create the modulated RF signal RFMOD and the IQ modulator 32 adjusts the frequency of the RF LO signal RFLOS to correspond to the desired receive frequency of the RF receive signal RFRX by modulating the RF carrier signal RFCAR to compensate for pulling of the receive frequency synthesizer 40, such that the maximum energy spectrum peak of the modulated RF signal RFMOD is shifted away from the RF carrier frequency. During the receive mode, the common frequency synthesizer 54 provides the RF LO signal RFLOS to the RF down-conversion circuitry 38 for down-conversion of the RF receive signal RFRX, such that the frequency of the RF LO signal RFLOS corresponds to the desired receive frequency of the RF receive signal RFRX.

Figures 6A, 6B:
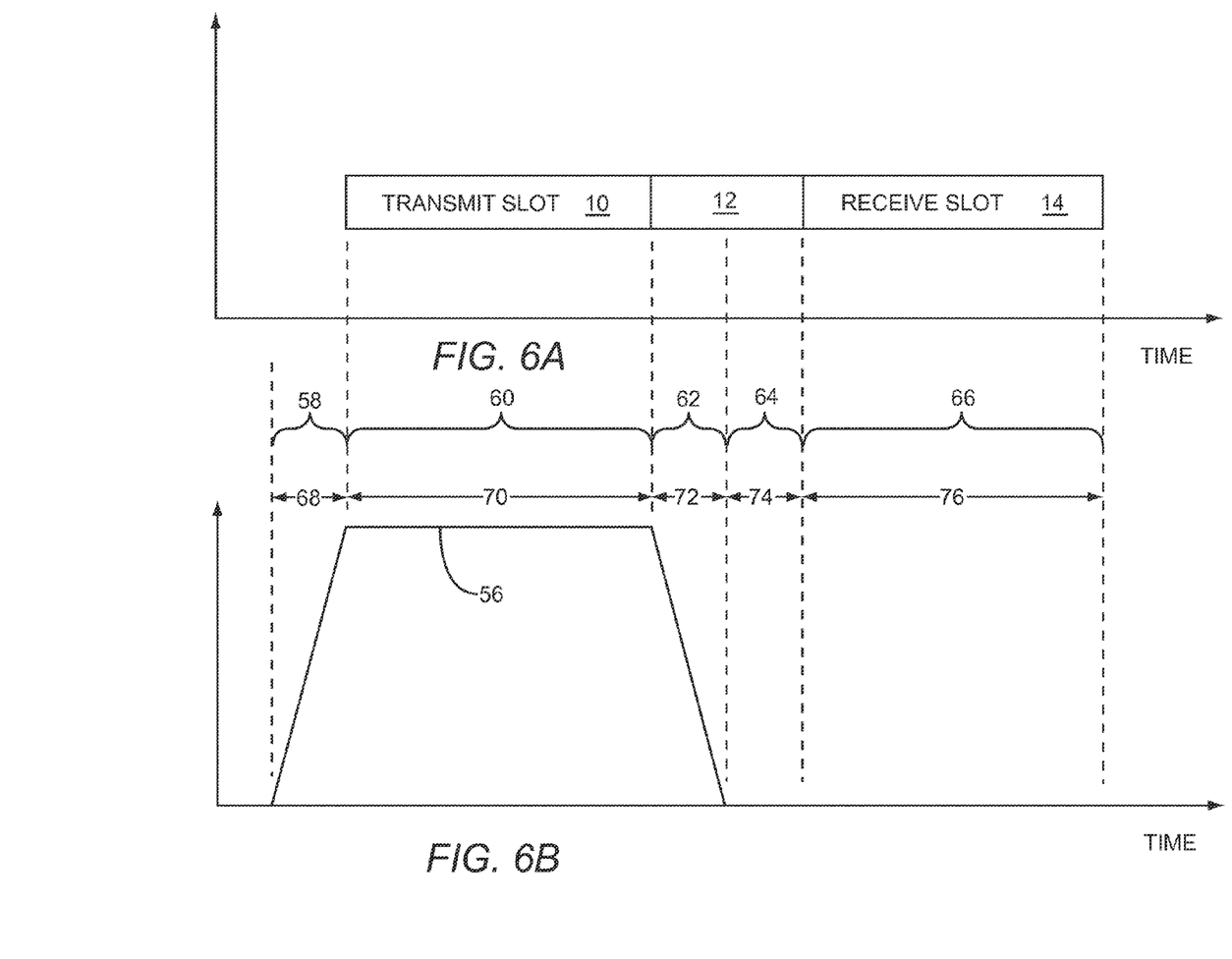
FIGS. 6A and 6B illustrate a transmission and reception scenario of the RF circuitry illustrated in FIG. 3 according to one embodiment of the RF circuitry.

FIGS. 6A and 6B illustrate a transmission and reception scenario of the RF circuitry 24 illustrated in FIG. 3 according to one embodiment of the RF circuitry 24. FIG. 6A shows the transmit slot 10, which is followed by the guard period 12, which is followed by the receive slot 14. FIG. 6B shows an average amplitude 56 of the RF transmit signal RFTX and shows a ramp-up mode 58, which is followed by a data burst mode 60, which is followed by an energy-shifted ramp-down mode 62, which is followed by a receive preparation mode 64, which is followed by a receive mode 66. The transmit slot 10 is transmitted during the data burst mode 60 by the RF circuitry 24, the energy-shifted ramp-down mode 62 occurs during a first portion of the guard period 12, the receive preparation mode 64 occurs during a second portion of the guard period 12, and the receive slot 14 is received by the RF circuitry 24 during the receive mode 66. The ramp-up mode 58 has a ramp-up duration 68, the data burst mode 60 has a data burst duration 70, the energy-shifted ramp-down mode 62 has a energy-shifted ramp-down duration 72, the receive preparation mode 64 has a receive preparation duration 74, and the receive mode 66 has a receive duration 76. In a first exemplary embodiment of the RF circuitry 24, the energy-shifted ramp-down duration 72 is equal to between about 5.5 microseconds and about 7.5 microseconds, and the receive preparation duration 74 is equal to between about 5 microseconds and about 7 microseconds. In a second exemplary embodiment of the RF circuitry 24, the energy-shifted ramp-down duration 72 is equal to about 6.5 microseconds, and the receive preparation duration 74 is equal to about 6 microseconds.

Figure 7A:
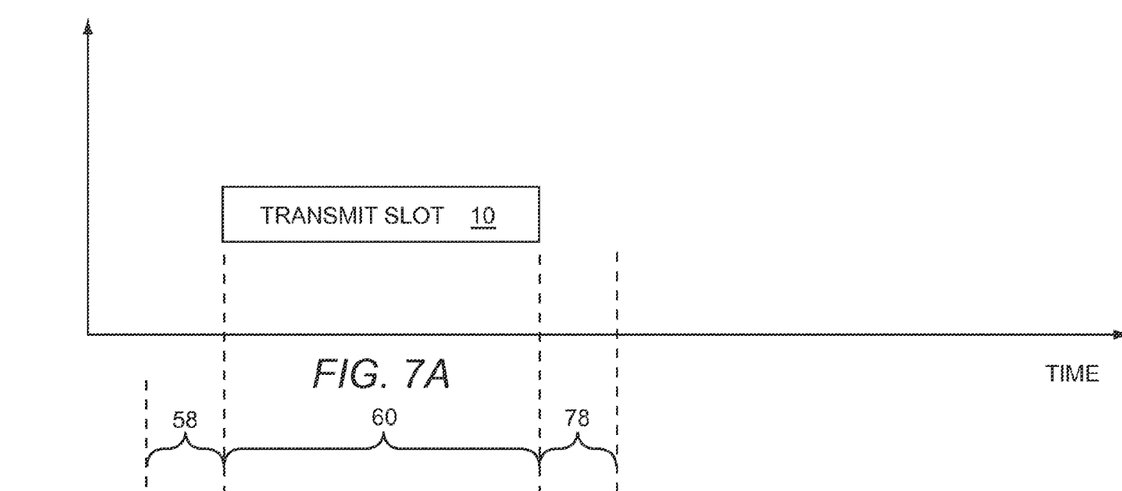
FIGS. 7A and 7B illustrate a transmission and reception scenario of the RF circuitry illustrated in FIG. 3 according to an alternate embodiment of the RF circuitry.
Figure 7B:
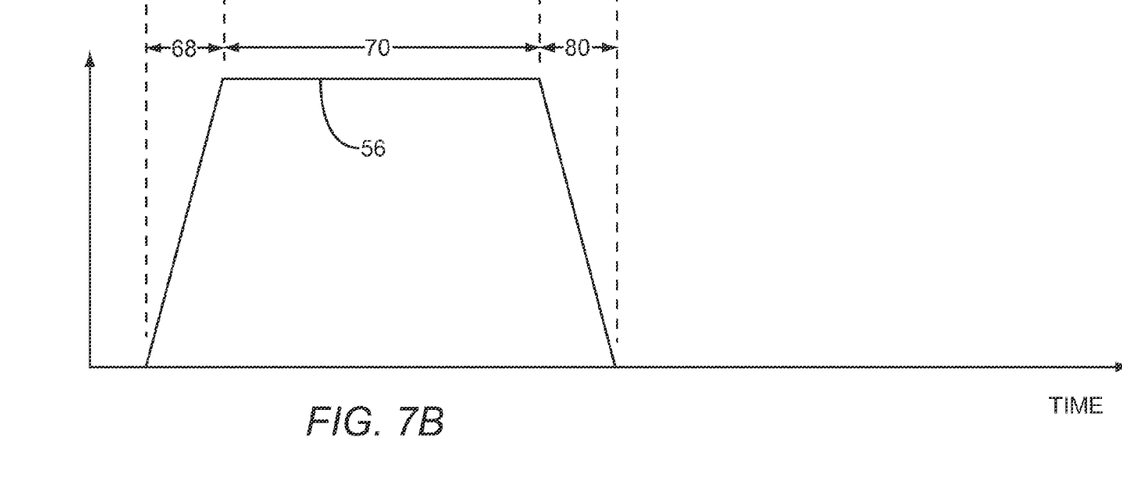

FIGS. 7A and 7B illustrate a transmission scenario of the RF circuitry 24 illustrated in FIG. 3 according to an alternate embodiment of the RF circuitry 24. FIG. 7A shows the transmit slot 10, which is not immediately followed by the guard period 12. As such, the transmit slot 10 illustrated in FIG. 7A may be transmitted by the RF circuitry 24 without the restrictions imposed by the guard period 12. FIG. 7B shows an average amplitude 56 of the RF transmit signal RFTX and shows the ramp-up mode 58, which is followed by the data burst mode 60, which is followed by a standard ramp-down mode 78 instead of the energy-shifted ramp-down mode 62. The standard ramp-down mode 78 has a standard ramp-down duration 80.

Figure 8A:
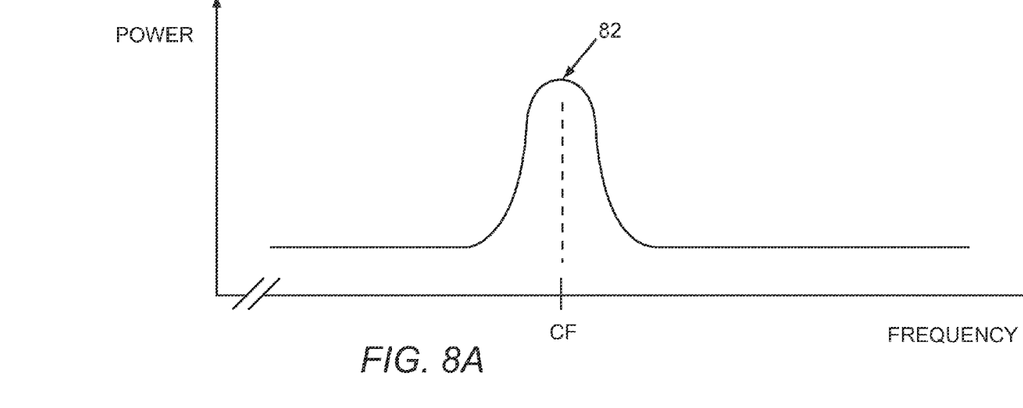
FIGS. 8A and 8B show an energy spectrum of a modulated RF signal according to one embodiment of the RF circuitry.
Figure 8B:
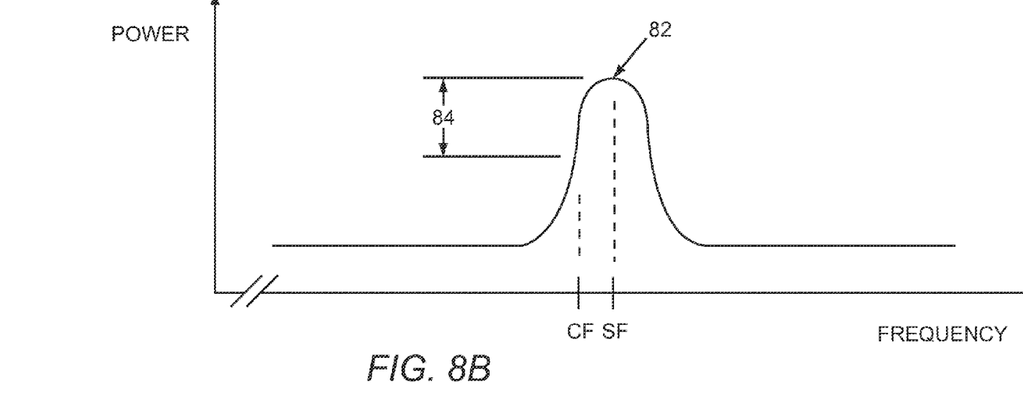

FIGS. 8A and 8B show an energy spectrum of the modulated RF signal RFMOD according to one embodiment of the RF circuitry 24. FIG. 8A shows the energy spectrum of the modulated RF signal RFMOD during the data burst mode 60 and FIG. 8B shows the energy spectrum of the modulated RF signal RFMOD during the energy-shifted ramp-down mode 62. During the data burst mode 60, the energy spectrum of the modulated RF signal RFMOD has a maximum energy spectrum peak 82 that is about coincident with an RF carrier frequency CF of the RF carrier signal RFCAR as illustrated in FIG. 8A. During the energy-shifted ramp-down mode 62, the energy spectrum of the modulated RF signal RFMOD has a maximum energy spectrum peak 82 that is shifted away from the RF carrier frequency CF of the RF carrier signal RFCAR as illustrated in FIG. 8B. The maximum energy spectrum peak 82 occurs at a shifted frequency SF. As a result, there is a difference 84 between an energy level of the energy spectrum at the maximum energy spectrum peak 82 and an energy level of the energy spectrum at the RF carrier frequency CF. The energy level of the energy spectrum at the RF carrier frequency CF is less than the energy level of the energy spectrum at the maximum energy spectrum peak 82. In a first exemplary embodiment of the RF circuitry 24, the difference 84 is at least 10 decibels (dB). In a second exemplary embodiment of the RF circuitry 24, the difference 84 is at least 20 dB.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. Radio frequency (RF) circuitry comprising:
   control circuitry adapted to select one of a plurality of operating modes, such that the plurality of operating modes comprises a data burst mode, and an energy-shifted ramp-down mode; and
   IQ modulation circuitry adapted to:
      during the data burst mode, modulate an RF carrier signal having an RF carrier frequency to provide a modulated RF signal, such that a maximum energy spectrum peak of the modulated RF signal is about coincident with the RF carrier frequency; and
      during the energy-shifted ramp-down mode, modulate the RF carrier signal to provide the modulated RF signal, such that the maximum energy spectrum peak is shifted away the RF carrier frequency.

2. The RF circuitry of claim 1 wherein during the energy-shifted ramp-down mode:

the maximum energy spectrum peak is associated with an energy spectrum of the modulated RF signal; and an energy level of the energy spectrum at the RF carrier frequency is at least 10 decibels (dB) less than the maximum energy spectrum peak.

3. The RF circuitry of claim 1 wherein during the energy-shifted ramp-down mode:

the maximum energy spectrum peak is associated with an energy spectrum of the modulated RF signal; and an energy level of the energy spectrum at the RF carrier frequency is at least 20 decibels (dB) less than the maximum energy spectrum peak.

4. The RF circuitry of claim 1 wherein:

the plurality of operating modes further comprises a standard ramp-down mode and a ramp-up mode;

the ramp-up mode is immediately followed by the data burst mode; and the standard ramp-down mode is immediately preceded by the data burst mode.

5. The RF circuitry of claim 1 further comprising RF down-conversion circuitry adapted to during a receive mode, receive and down-convert an RF receive signal to provide a baseband receive signal, such that RF power amplifier circuitry is adapted to during the data burst mode and the energy-shifted ramp-down mode, receive and amplify the modulated RF signal to provide an RF transmit signal, wherein the plurality of operating modes further comprises the receive mode.

6. The RF circuitry of claim 5 wherein a carrier frequency of the RF transmit signal is about equal to a carrier frequency of the RF receive signal.

7. The RF circuitry of claim 6 wherein the RF down-conversion circuitry comprises direct current (DC) offset correction circuitry adapted to:

during the energy-shifted ramp-down mode and a receive preparation mode, measure a DC offset of the RF down-conversion circuitry to obtain a measured DC offset; and during the receive mode, apply a DC offset correction to the RF down-conversion circuitry based on the measured DC offset, wherein the plurality of operating modes further comprises the receive preparation mode.

8. The RF circuitry of claim 7 wherein a bandwidth of the DC offset correction circuitry is wider during the receive preparation mode than during the energy-shifted ramp-down mode.

9. The RF circuitry of claim 6 further comprising a common frequency synthesizer adapted to:

during the data burst mode, provide the RF carrier signal to an IQ modulator to create the modulated RF signal; and during the energy-shifted ramp-down mode, provide an RF local oscillator (LO) signal to the RF down-conversion circuitry, such that the RF carrier signal to provide the modulated RF signal adjusts a frequency of the RF LO signal to correspond to a desired receive frequency of the RF receive signal to compensate for pulling of the common frequency synthesizer; and during the receive mode, provide the RF LO signal to the RF down-conversion circuitry for down-conversion of the RF receive signal, such that the frequency of the RF LO signal corresponds to the desired receive frequency of the RF receive signal.

10. The RF circuitry of claim 6 further comprising:

a receive frequency synthesizer adapted to:

during the energy-shifted ramp-down mode, provide an RF local oscillator (LO) signal to the RF down-conversion circuitry, such that a frequency of the RF LO signal corresponds to a desired receive frequency of the RF receive signal; and during the receive mode, provide the RF LO signal to the RF down-conversion circuitry for down-conversion of the RF receive signal, such that the frequency of the RF LO signal corresponds to the desired receive frequency of the RF receive signal; and a transmit frequency synthesizer adapted to:

during the data burst mode, provide the RF carrier signal to an IQ modulator to create the modulated RF signal; and during the energy-shifted ramp-down mode, adjust the frequency of the RF LO signal to correspond to the desired receive frequency of the RF receive signal using the RF carrier signal to provide the modulated RF signal to compensate for pulling of the receive frequency synthesizer.

11. The RF circuitry of claim 6 wherein the RF transmit signal and the RF receive signal are time division duplexing (TDD) signals.

12. The RF circuitry of claim 11 wherein the RF transmit signal and the RF receive signal are long term evolution (LTE) signals.

13. The RF circuitry of claim 11 wherein the RF transmit signal and the RF receive signal are time division synchronous code division multiple access (TD-SCDMA) signals.

14. The RF circuitry of claim 1 wherein during the energy-shifted ramp-down mode, the RF carrier signal to provide the modulated RF signal includes shifting a frequency of the RF carrier signal.

15. The RF circuitry of claim 1 wherein during the energy-shifted ramp-down mode, the RF carrier signal to provide the modulated RF signal includes amplitude modulating the RF carrier signal.

16. The RF circuitry of claim 1 wherein during the energy-shifted ramp-down mode, the RF carrier signal to provide the modulated RF signal includes phase modulating the RF carrier signal.

17. The RF circuitry of claim 1 wherein during the energy-shifted ramp-down mode, the RF carrier signal to provide the modulated RF signal includes amplitude modulating and phase modulating the RF carrier signal.

18. The RF circuitry of claim 1 wherein during the energy-shifted ramp-down mode, the RF carrier signal to provide the modulated RF signal includes sending a string of data via the modulated RF signal.

19. The RF circuitry of claim 18 wherein the string of data includes alternating ones and zeros.

20. The RF circuitry of claim 1 wherein a duration of the energy-shifted ramp-down mode is equal to between about 5.5 and about 7.5 microseconds, and a duration of a receive preparation mode is equal to between about 5 and about 7 microseconds, wherein the plurality of operating modes further comprises the receive preparation mode.

21. The RF circuitry of claim 1 wherein a duration of the energy-shifted ramp-down mode is equal to about 6.5 microseconds and a duration of a receive preparation mode is equal to about 6 microseconds, wherein the plurality of operating modes further comprises the receive preparation mode.

22. The RF circuitry of claim 1 further comprising:

RF power amplifier circuitry adapted to during the data burst mode and the energy-shifted ramp-down mode, receive and amplify the modulated RF signal to provide an RF transmit signal; and RF down-conversion circuitry adapted to during a receive mode, receive and down-convert an RF receive signal to provide a baseband receive signal, wherein the plurality of operating modes further comprises the receive mode.

23. A method comprising:
selecting one of a plurality of operating modes, such that the plurality of operating modes comprises a data burst mode, and an energy-shifted ramp-down mode;
providing IQ modulation circuitry;
during the data burst mode, modulating an RF carrier signal having an RF carrier frequency to provide a modulated RF signal, such that a maximum energy spectrum peak of the modulated RF signal is about coincident with the RF carrier frequency; and
during the energy-shifted ramp-down mode, modulating the RF carrier signal to provide the modulated RF signal, such that the maximum energy spectrum peak is shifted away the RF carrier frequency.

* * * * *